(12) United States Patent
Okayasu

(10) Patent No.: US 8,818,459 B2
(45) Date of Patent: Aug. 26, 2014

(54) HANDS-FREE DEVICE

(71) Applicant: Denso Corporation, Kariya (JP)

(72) Inventor: Takafumi Okayasu, Obu (JP)

(73) Assignee: Denso Corporation, Kariya (JP)

( * ) Notice: Subject to any disclaimer, the term of this patent is extended or adjusted under 35 U.S.C. 154(b) by 152 days.

(21) Appl. No.: 13/668,598

(22) Filed: Nov. 5, 2012

(65) Prior Publication Data

US 2013/0116012 A1 May 9, 2013

(30) Foreign Application Priority Data

Nov. 9, 2011 (JP) ................................. 2011-245433

(51) Int. Cl.
*H04M 1/00* (2006.01)
*H04M 1/60* (2006.01)

(52) U.S. Cl.
CPC .................................. *H04M 1/6091* (2013.01)
USPC ...................... 455/563; 455/569.1; 455/569.2

(58) Field of Classification Search
USPC ........ 455/563, 569.1, 569.2, 575.9, 297, 345; 379/389, 406, 347, 409
See application file for complete search history.

(56) References Cited

U.S. PATENT DOCUMENTS

| | | | |
|---|---|---|---|
| 6,317,715 B1 * | 11/2001 | Suzuki ........................... | 704/271 |
| 6,823,306 B2 * | 11/2004 | Reding et al. ................. | 704/244 |
| 8,335,687 B1 * | 12/2012 | Reding et al. ................. | 704/231 |
| 8,473,099 B2 * | 6/2013 | Sugiyama et al. ............. | 700/245 |
| 2012/0253817 A1 * | 10/2012 | Trinh ............................. | 704/270 |

FOREIGN PATENT DOCUMENTS

| | | |
|---|---|---|
| JP | 2000-134253 | 5/2000 |
| JP | 2002-158764 | 5/2002 |
| JP | 2003-114699 | 4/2003 |
| JP | 2004-064236 | 2/2004 |
| JP | 3747846 | 2/2006 |
| JP | 2006-060293 | 3/2006 |
| JP | 2006-319622 | 11/2006 |

OTHER PUBLICATIONS

Office action dated Aug. 27, 2013 in corresponding Japanese Application No. 2011-245433.

\* cited by examiner

*Primary Examiner* — Minh D Dao

(74) *Attorney, Agent, or Firm* — Harness, Dickey & Pierce, P.L.C.

(57) ABSTRACT

A hands-free device disposed in a vehicle identifies a speech direction of an outgoing voice when a hands-free call operation is received. The device extracts callee information from the outgoing voice provided by an occupant to identify a portable communication terminal. In particular, the portable communication terminal is identified when the callee information extracted is registered in a telephone book data of the portable communication terminal. When the speech direction of the outgoing voice is identified as a driver side, the portable communication terminal identified is linked to the driver as a driver-linked terminal. Accordingly, a call being received by a portable communication terminal that is linked to the driver is performed as a hands-free call, whereas a call being received by a portable communication terminal not linked to the driver is not performed as a hands-free call.

5 Claims, 4 Drawing Sheets

HANDS-FREE DEVICE

CROSS REFERENCE TO RELATED APPLICATION

The present application is based on and claims the benefit of priority of Japanese Patent Application No. 2011-245433, filed on Nov. 9, 2011, the disclosure of which is incorporated herein by reference.

TECHNICAL FIELD

The present disclosure generally relates to a hands-free device that establishes a connection to a portable communication terminal for performing a hands-free call.

BACKGROUND

In general, a hands-free device disposed in a vehicle is capable of allowing a user of a cellular telephone to conduct a call without having to operate the cellular telephone. For instance, when an incoming call is received via the cellular telephone, the hands-free device may output a sound/voice of the caller from a vehicle-installed speaker, and may input a sound/voice of a recipient of the call to a vehicle-installed microphone. One such device is disclosed in, for example, Japanese Patent Laid-Open No. 2000-134253.

In a situation where the cellular telephone belongs to a driver of the vehicle, the hands-free call function may be utilized by the driver for, at the very least, safety reasons. In a situation where the cellular telephone belongs to a passenger, who is not the driver, the operation of the hands-free call function may not be desired by the passenger. For instance, the passenger may want to keep the call private and may prefer not to have the driver or other passengers to know the content of the call or even the person who is calling.

Whether the cellular telephone brought into the vehicle is the driver's property or a passenger's property may be hard to determine. Therefore, it may be difficult to determine whether the hands-free call function should be established.

SUMMARY

In an aspect of the present disclosure, a hands-free device disposed in a vehicle performs a hands-free call for a portable communication terminal. The portable communication terminal includes a telephone book data stored therein. The hands-free device comprises a communication unit, a memory unit, a voice output unit, a voice input unit, an operation input unit, a speech direction identification unit, a terminal identification unit, and a control unit.

The communication unit communicably couples the hands-free device to the portable communication terminal. The portable communication terminal transmits the telephone book date to the communication unit. The telephone book is then stored in the memory unit.

The voice output unit includes a speaker to output a receiving voice of the hands-free call. The voice input unit includes at least two microphones for inputting an outgoing voice of the hands-free call.

The operation input unit receives a hands-free call start operation. For instance, the operation input unit may include an operation switch, which when operated, activate a hands-free call start operation. When the hands-free call start operation is received by the operation input unit, the speech direction identification unit identifies a speech direction of the outgoing voice inputted by the voice input unit. In addition, the terminal identification unit identifies the portable communication terminal being used for the hands-free call.

The control unit performs a link process to link the portable communication terminal identified by the terminal identification unit with a driver of the vehicle as a driver-linked terminal. For instance, the control unit may link the portable communication terminal with the driver when the speech direction identification unit identifies the speech direction of the outgoing voice as a driver side. The control unit performs the hands-free call when a call being received is linked with the driver (i.e., is the driver-linked terminal) and does not perform the hands-free call when the call being received is not linked with the driver.

As described above, when the speaker of the outgoing voice is identified as the driver via by the speech direction identification unit and the portable communication terminal transmitting the hands-free call has been identified by the terminal identification unit, the portable communication terminal, which was identified, is linked to the driver. In other words the portable communication terminal is identified as a driver's stuff.

The hands-free device identifies a portable communication as either a driver's belonging or a passenger's belonging. Therefore, if the portable communication device receiving a call belongs to the driver, the hands-free device performs a hands-free call. Otherwise, the hands-free device does not perform a hands-free call. In such manner, when a portable communication terminal belonging to the passenger of the vehicle receives a call, the contents of such call are kept private. Privacy is automatically provided for the owner of the portable communication terminal when the call is received by the portable communication terminal that is not linked to the driver.

Further, even when there is only one portable communication terminal in the vehicle, such terminal is first linked to the driver before the hands-free device performs a hands-free call of a call that is being received. In other words, the hands-free device of the present disclosure securely determines that the driver is using his/her own portable communication terminal and is not the passenger's portable communication terminal. In addition, whether to perform the hands-free call is determined based on the speech direction and the identification of the portable communication terminal, no operation by the driver or by the other occupant is required. Therefore, the user convenience for using the hands-free device is improved.

BRIEF DESCRIPTION OF THE DRAWINGS

Other objects, features and advantages of the present disclosure will become more apparent from the following detailed description with reference to the accompanying drawings, in which.

DETAILED DESCRIPTION

The following description explains a hands-free device in one embodiment of the present disclosure with reference to FIG. 1 to FIG. 4.

Figure 1:
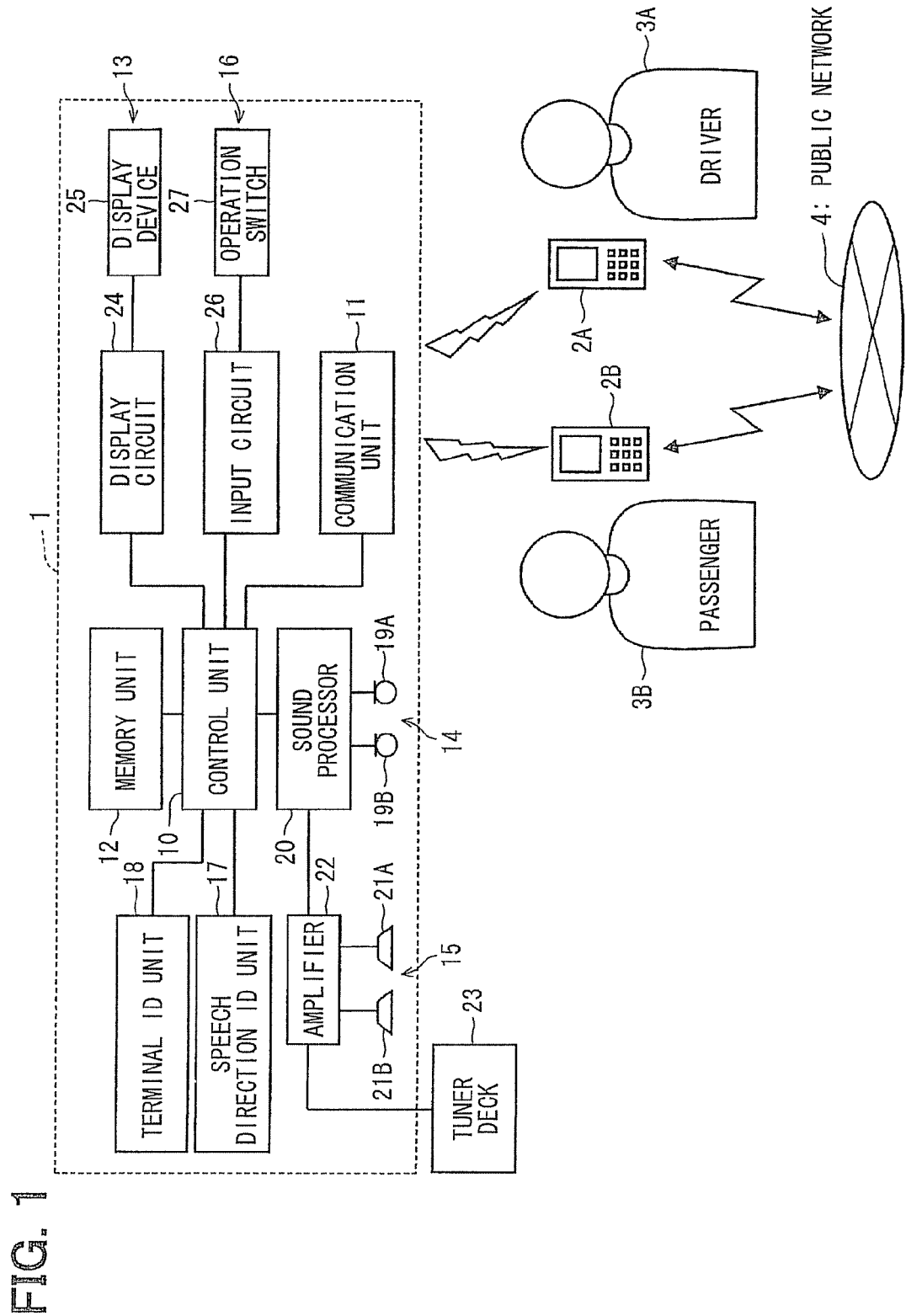
FIG. 1 is a block diagram of an in-vehicle apparatus of the present disclosure.
Figure 2:
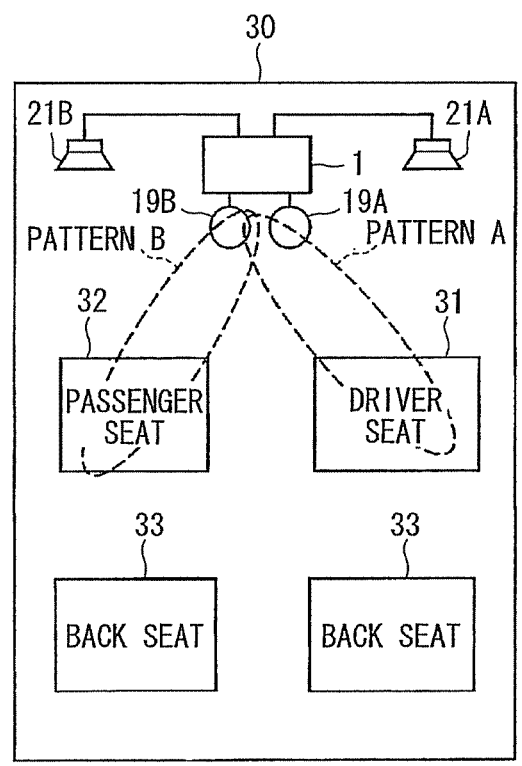
FIG. 2 is an illustration of a vehicle compartment where the in-vehicle apparatus is installed.

With reference to FIGS. 1 and 2, an in-vehicle apparatus 1 serving as a hands-free device is installed in a vehicle. In particular, the in-vehicle apparatus 1 may be installed in a compartment 30 of the vehicle. The in-vehicle apparatus 1 is coupled to portable communication terminals 2A, 2B that are brought into the compartment 30 enabling data communication therebetween. The portable communication terminals 2A, 2B may be considered a personal belonging of an occupant of the vehicle. For instance, the portable communication terminal 2A may belong to a vehicle driver 3A, and the portable communication terminal 2B may belong to a passenger 3B. In the following description, if the description uses a portable communication terminal "2" without referring to A or B, such description is commonly applicable to both of the portable communication terminals 2A and 2B. In addition for brevity the portable communication terminal 2 may simply be referred to as terminal 2.

The terminal 2 has a telephone function for enabling a call through a public network 4. Further, the terminal 2 is capable of communicating with the in-vehicle apparatus 1 through a connection of a hands-free call function for enabling a hands-free call. The terminal 2 stores a telephone book data that includes, for example, a name and a telephone number associated with the name. Further, the terminal 2 also stores identification information of itself, that is, a telephone number, a product number, a name given by the owner and the like assigned thereto. Further, in the present embodiment, the terminal 2 may be provided as a cellular telephone or a smart phone.

The in-vehicle apparatus 1 includes a control unit 10, a communications unit 11, a memory unit 12, a display unit 13, a voice input unit 14, a voice output unit 15, an operation input unit 16, a speech direction identification unit 17 and a terminal identification unit 18. The control unit 10 is implemented as a microcomputer, which includes a CPU, a RAM, a ROM and an input/output interface. According to a computer program stored in the ROM or in the memory unit 12, the control unit 10 controls various operations of the in-vehicle apparatus 1, such as communication operations, display operations, as well as controlling a hands-free call function.

Further, the control unit 10 may realize the speech direction identification unit 17 and the terminal identification unit 18 by executing a computer program. The speech direction identification unit 17 and the terminal identification unit 18 links the terminal 2 with the driver of the vehicle, and determines whether to perform a hands-free call based on such linking. Details of such operation are described later.

The communication unit 11 communicably couples the in-vehicle apparatus 1 with the terminal 2. The communication unit 11 adopts a Bluetooth (a registered trademark) as its short range wireless communication method. Further, the communication unit 11 may be a so-called wireless LAN, and may have a circuit for wired communication such as a Universal Serial Bus (i.e., USB). The communication unit 11 is configured to be capable of connecting to one or more terminals 2. The in-vehicle apparatus 1 acquires the telephone book data and the identification information of the connected terminal 2 through the communication unit 11. When the terminal 2 of the present embodiment is brought into the vehicle, the communication unit 11 automatically performs a process that is required for performing a hands-free call such as acquisition of the telephone book data and the identification information.

The memory unit 12 is a memory device (i.e., a storage medium) that can read and write various data. The memory unit 12 stores a computer program to control the in-vehicle apparatus 1, as well as, telephone book data and identification information of the terminal 2 acquired through the communication unit 11. When two or more terminals 2 are connected, the memory unit 12 stores the telephone book data and the identification information of each the terminals 2 connected thereto.

The voice input unit 14 includes two microphones 19A, 19B and a sound processor 20. The voice output unit 15 includes the sound processor 20, two speakers 21A, 21B, and an amplifier 22. In the following, if the description is commonly applicable to both of the two microphones 19A, 19B, the two microphones 19A, 19B are simply designated as the microphone 19, and such description scheme may also apply to the speakers 21A, 21B.

The microphone 19 inputs sound, such as a voice, in the compartment 30, and the speaker 21 outputs sound, such as a voice, in to the compartment 30. The microphone 19 is used to identify who is speaking in the compartment 30. Therefore, the microphone 19 is provided in at least two positions, where the two positions are close to each other. That is, the microphone 19 may be a so-called array microphone. Further, one or more speakers 21 may be used to output the sound into the compartment 30.

The sound processor 20 has a filter circuit, an ND conversion circuit, and a D/A conversion circuit. The sound processor 20 performs a digital conversion process of a voice provided by the microphone 19 and an analog conversion process of a voice outputted from the speaker 21. In other words, the sound processor 20 in the in-vehicle apparatus 1, which serves as the hands-free device, processes an input/output voice for performing the hands-free call.

All sounds spoken by an occupant in the compartment 30 are inputted to the microphone 19 of the voice input unit 14, regardless of who, among many occupants, is a speaker. Further, the speaker 21 of the voice output unit 15 outputs a voice/sound that is heard by all occupants in the compartment 30. Therefore, the conversation taking place between an occupant of the vehicle and a caller is heard by all the occupants in the compartment 30.

Further, a tuner deck 23 is, for example, coupled to the amplifier 22 of the in-vehicle apparatus 1, and is capable of outputting a radio program, music data, or the like. The display unit 13 has a display circuit 24 and a display device 25. Based on a display instruction signal from the control unit 10, the display circuit 24 generates a control signal to control display contents to be displayed on the display device 25. The display device 25 implemented as a liquid crystal display unit or an organic electroluminescence display unit displays, for example, operation screens of the in-vehicle apparatus 1 or the like. Further, the display unit 13 displays information of a caller such as a name, a telephone number, when a call is received at a time of enabling a hands-free call.

The operation input unit 16 includes an input circuit 26 and an operation switch (SW) 27 having multiple switches. The input circuit 26 outputs to the control unit 10 an electrical signal representing an operation of the operation switch 27. The operation switch 27 may include various types of switches for accepting operation inputs for the in-vehicle apparatus 1. For example, a touch switch on the display device 25, a push switch arranged around the display device 25, or a switch on a steering wheel. An operation for starting a hands-free call (i.e., for placing a call) and for picking up an incoming call (i.e., for receiving a call), which are to be described later, is input from a switch of the operation input unit 16.

The speech direction identification unit 17 identifies a direction of a voice that is picked up by the microphone 19. The in-vehicle apparatus 1 may be arranged on an instrumental panel in a front part of the compartment 30, as shown in FIG. 2. In the compartment 30 includes a driver's seat 31, a passenger seat 32 next to the driver's seat, and two back seats 33. The speech direction identification unit 17 can perform, for example, a beamforming process (i.e., a signal processing of well-known type) of the voice provided from the two microphones 19A, 19B, for changing the directivity. Details of the beamforming process will not be described, due to its wide and well known status in the art. Further, a positional relationship between the microphone 19, the driver's seat 31, and the passenger seat 32 is set in advance, and is stored in the memory unit 12.

When a voice is provided, the speech direction identification unit 17 identifies a speech direction, as a direction of the voice, based on, for example, a comparison of the sound volume of the voice. For instance, with reference to FIG. 2, when a voice is inputted, the speech direction identification unit 17 compares a sound volume of the voice in a pattern A direction from the driver's seat 31 side with a sound volume of the voice in a pattern B direction from the passenger seat 32 side. If the sound volume of the pattern A direction is greater, the speech direction is identified as the driver's seat 31 side.

In such case, the directivities such as the pattern A direction and the pattern B direction may be fixed directions set in advance, or, the directivities may be variably changed during the detection of the sound/voice for identifying the maximum sound volume as the speech direction. Further, when the pattern A direction and the pattern B direction are predetermined, the signal processing for two directions may be performed in parallel, or, the signal processing for each direction may alternatively be performed. The speech direction identification unit 17 and the terminal identification unit 18 to be mentioned later may be realized as hardware.

The terminal identification unit 18 identifies the terminal 2 connected to the in-vehicle apparatus 1. More practically, the terminal identification unit 18 performs a sound recognition process for analyzing the voice from the microphone 19. For instance if the voice includes information regarding a callee, the terminal identification unit 18 determines whether the callee of the hands-free call included in the voice is registered in the telephone book data. If the callee is registered, the terminal identification unit 18 identifies the terminal 2 having the callee information registered therein. In other words, based on the correspondence between the terminal 2 being used in the hands-free call and the identification information of the callee, the terminal identification unit 18 identifies the terminal 2.

Figure 3:
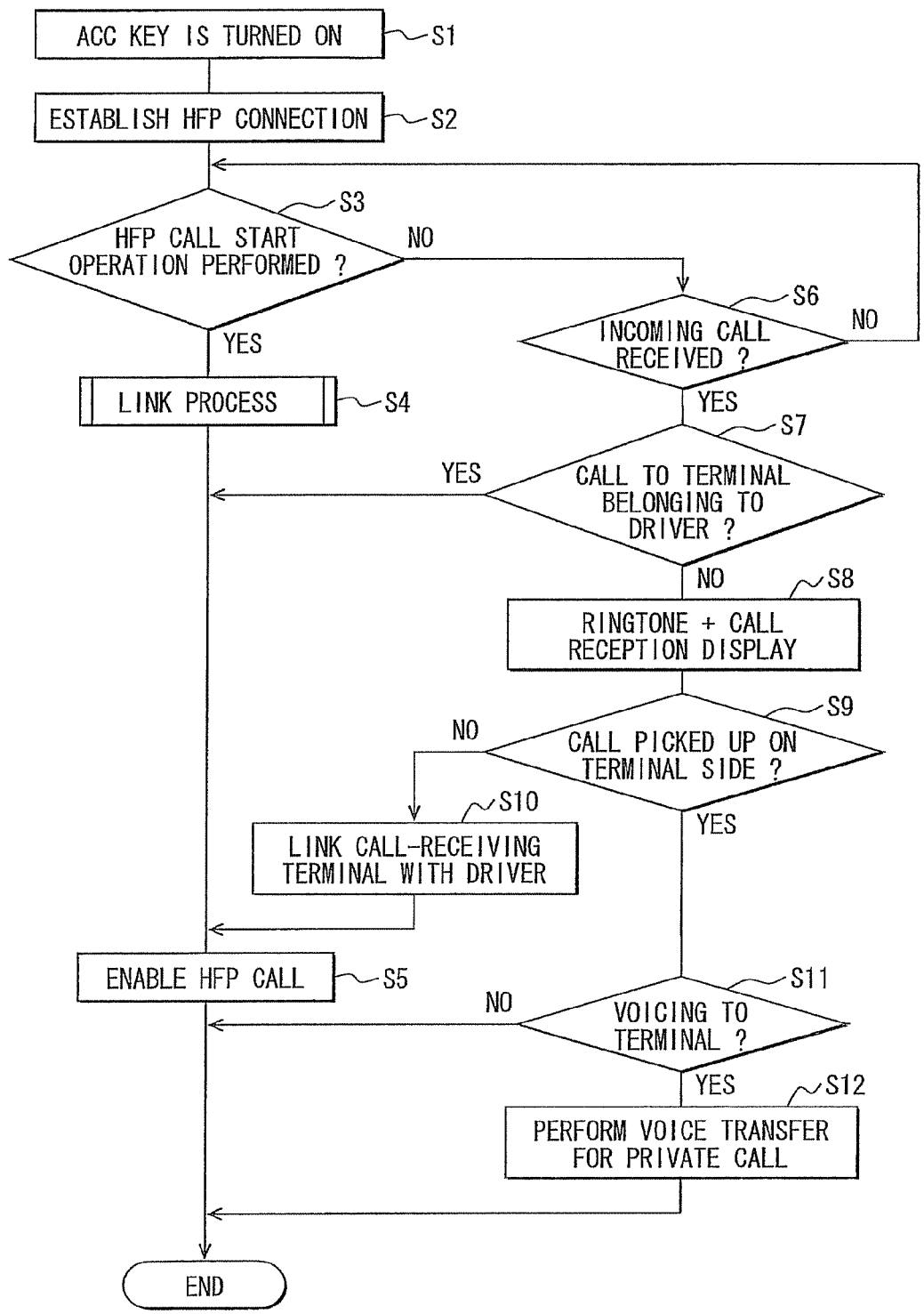
FIG. 3 is a flowchart of an HFP call start process performed by the in-vehicle apparatus.
Figure 4:
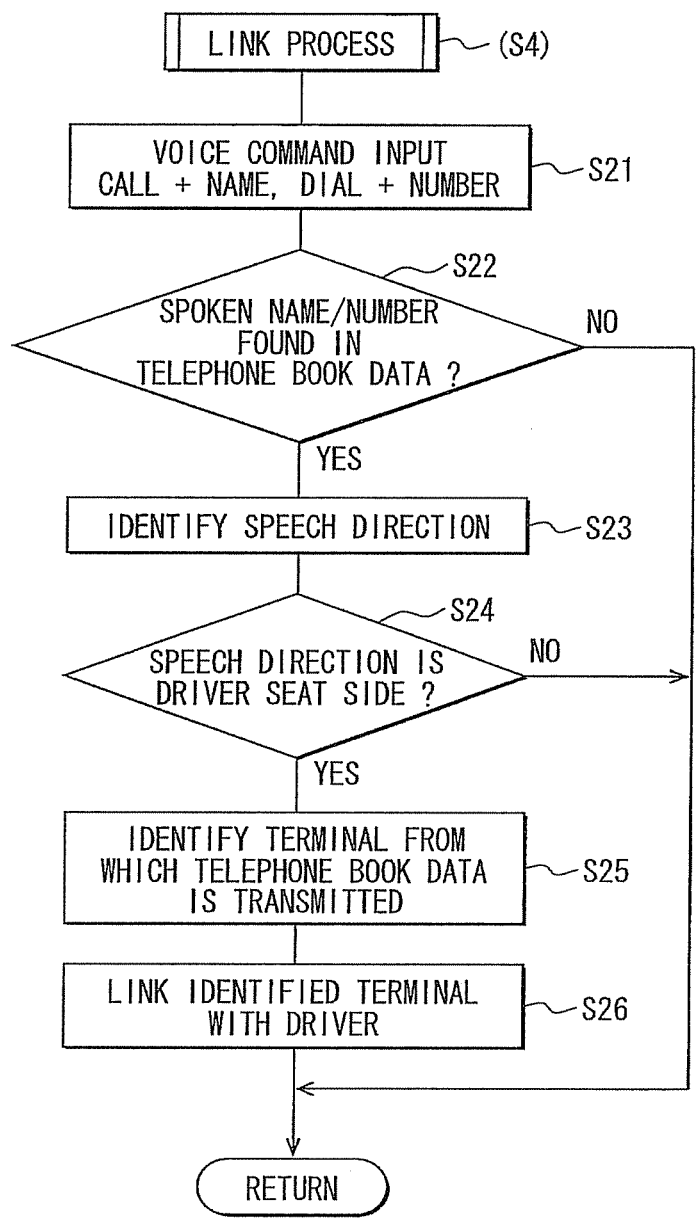
FIG. 4 is a flowchart of a link process performed by the in-vehicle apparatus.

The in-vehicle apparatus 1 has a hands-free (HFP) call function to allow receipt and placement of a call without actually operating the terminal 2. The in-vehicle apparatus 1 performs an HFP call start process shown in FIG. 3 and a link process shown in FIG. 4. These processes may be performed by the control unit 10, the speech direction identification unit 17, or the terminal identification unit 18. For the purpose of brevity and clarity of the description the processes of FIGS. 3 and 4 are described as being performed by the in-vehicle apparatus 1. Further, in the following description, it is assumed that the terminals 2A, 2B are already brought into the compartment 30.

With reference to FIG. 3, in S1, when an accessory (ACC) key of the vehicle is turned to an ON position, the in-vehicle apparatus 1, in S2, establishes an HFP connection. In the HFP connection process, the in-vehicle apparatus 1 communicably couples via Bluetooth (a registered trademark) to terminals 2 brought into the compartment 30. The in-vehicle apparatus 1 obtains the telephone book data and the identification information from the terminals 2 and associates the telephone book data with the identification information, so as to distinguish which telephone book data belongs to which terminal 2. Such data and association is stored in the memory unit 12.

In such manner, the in-vehicle apparatus 1 is automatically connected to the terminal 2 in the compartment 30 through Bluetooth communication after a power supply is turned on, and the in-vehicle apparatus 1 obtains the telephone book data and the identification information from the connected terminal 2, and performs preparations for the hands-free call (i.e. an HFP connection in S2).

Once the HFP connection is established, the in-vehicle apparatus 1 repeatedly determines whether an HFP call start operation is to be performed (S3) and whether an incoming call has been received (S6). In other words, the in-vehicle apparatus waits for a placement of an outbound call or a reception of an inbound call.

The HFP call start operation of S3 may be detected various ways. For example, an operation to start a voice recognition function (i.e., an operation for allowing a voice command to start the HFP call function), an operation on a touch switch that corresponds to a start menu displayed on the display unit 13, and an operation of one of the multiple switch of the operation switch 27, which is set to be serving as a start switch. In the present embodiment, the start of the voice recognition function is assumed as the HFP call start operation.

Though the automatic connection between the in-vehicle apparatus 1 and both of the terminals 2A, 2B may improve the convenience of the user, such automatic connection of HFP from the in-vehicle apparatus 1 to both of the terminals 2A, 2B, one of which belonging to a driver 3A and the other belonging to a passenger 3B, may not necessarily be desirable. In other words, after storing the telephone book data and the identification information of both of the terminals 2A, 2B, the in-vehicle apparatus 1 is enabled to perform a hands-free call for both of the terminals 2A, 2B. Therefore, even when the terminal 2B belonging to the passenger 3B is receiving an incoming call, such a call may be picked up by the driver 3A, or the voice of the caller for the passenger 3B may be output from the speaker 21, which may not be desirable for the passenger 3B. For instance, the passenger 3B may not want the other occupants in the compartment 30 to hear the conversation or may not want to display the caller's name on the display unit 13. In other words, performing the handsfree call based simply on the HFP connection to the terminal 2 may not be desirable in terms of privacy of the owner of the terminal 2, or may not appropriately protect the privacy of the owner of the terminal 2.

Therefore, the in-vehicle apparatus 1 controls and determines whether to perform a hands-free call based on an association between the terminal 2 and the driver 3A in the following manner.

When the in-vehicle apparatus 1 receives an operation input for starting the voice recognition function, which is considered as a start operation of the hands-free call (S3: YES), the link process of FIG. 4 is performed in S4.

With reference to FIG. 4, the in-vehicle apparatus 1, in S21, receives a voice command (S21). In such case, for example, the in-vehicle apparatus 1 accepts the voice command, such as "Call+name" or "Dial+telephone number" or the like. Based on the voice command, which is detected by the microphone and recognized by the sound processor 20, the in-vehicle apparatus 1 recognizes the term "Call" as the HFP call function start command. The subsequent input after the term "Call" of the voice command is extracted as the callee's name (i.e., the person to be called).

A voice command that includes the term "Dial" may be also be interpreted as the HFP call function start command, and leads to the extraction of the callee's telephone number. The telephone number may be an abbreviated number, or a registration number of the callee in the telephone book data. In other words, in S21, the in-vehicle apparatus 1 recognizes the start of the HFP call function, and extracts the callee information from the voice command, which is detected by the microphone and recognized by the sound processor 20.

In S22, the in-vehicle apparatus 1 determines whether the extracted callee information, which may be the name or the telephone number spoken in the voice command, is included in the telephone book data stored in the memory unit 12. As described above, the memory unit 12 stores the data of the telephone books along with the identification number of the corresponding terminals 2A, 2B, from which the telephone book data is obtained. Therefore, in S22, the in-vehicle apparatus 1 determines whether the callee information (e.g., the name or telephone number), which was extracted in S21, is registered in the telephone book data.

If the callee information is found in either of the two telephone books (S22:YES), the in-vehicle apparatus 1, in S23, identifies the speech direction from which the voice command was spoken. Such identification is performed by the speech direction identification unit 17 as described above. In S24 the in-vehicle apparatus 1 determines whether the speech direction of the voice command is driver seat side. If the speech direction is the driver's seat side (i.e., the pattern A of FIG. 2) (S24:YES), the in-vehicle apparatus 1 identifies a terminal 2 based on the fact that the telephone book data having the callee information registered therein is obtained from a portable communication terminal 2 (S25).

In other words, the in-vehicle apparatus 1 identifies the terminal 2 as the one that has transmitted to the in-vehicle apparatus 1, such telephone book data having the callee information (i.e., spoken name/number). In such case, based on the callee information, the in-vehicle apparatus 1 identifies that the terminal 2 is, for example, the terminal 2A with reference to the identification information stored in the memory unit 12. In addition, since the speech direction of the voice command is the driver seat side, the in-vehicle apparatus 1, in S26, links the terminal 2A with the driver 3A.

As described above, when an HFP call is placed, the in-vehicle apparatus 1 links/associates the terminal 2 with the driver 3A based on a condition that (i) the terminal 2 having the callee information registered in its telephone book is identified and (ii) the speech direction of the voice command, from which the callee information was extracted, is identified as the driver's seat side. After the linkage of the terminal 2A with the driver 3A, the in-vehicle apparatus 1 returns to the HFP call start process of FIG. 3.

If the callee information is not found in the telephone book data in S22 of the link process (S22:NO), the in-vehicle apparatus 1 returns to the HFP call start process without identifying the terminal 2. If the speech direction is not the driver's seat side (S24:NO), there is no need to link the terminal 2 with the driver 3A, and the in-vehicle apparatus 1 returns to the HFP call start process without linking the terminal 2.

After the link process, the in-vehicle apparatus 1, in S5, enables the HFP call (S5). In other words, the in-vehicle apparatus 1 allows the use of the HFP call function, and the in-vehicle apparatus 1 performs required processes for the HFP call, such as transmitting a sound/voice in the compartment 30 that is detected by the microphone 19 to the terminal 2 (i.e., a voice transmission process) and receiving a sound/voice from the terminal 2 and outputting the sound/voice from the speaker 21 to the compartment 30.

Accordingly, even when the in-vehicle apparatus 1 has not provided the link/association for the terminal 2 per the link process performed in S4, the in-vehicle apparatus 1 enables the HFP call, since at least one of the occupants in the compartment 30 has provided the HFP call start operation in S21. In other words, since an intention to start the HFP call has been explicitly expressed, the HFP call is enabled.

As described above, when the HFP call start operation is performed, the in-vehicle apparatus 1 performs a link process for linking the terminal 2A with the driver 3A.

On the other hand, when an incoming call is received (S6:YES), the in-vehicle apparatus 1, in S7, determines whether the terminal 2, which is receiving the incoming call is the terminal 2 belonging to the driver 3A. If the terminal 2 belongs to the driver 3A (i.e., if the terminal 2 is the terminal 2A) (S7:YES), the in-vehicle apparatus 1 proceeds to S5 to enable an HFP call. In other words, the in-vehicle apparatus 1 performs an HFP call when the terminal 2A owned by the driver 3A receives a call, on condition that the link between the terminal 2A and the driver 3A has already been established by the link process.

In contrast, when the incoming call is not being received by the terminal 2 belonging to the driver 3A (S7:NO), the in-vehicle apparatus 1 proceeds to S8. In particular, the determination that the incoming call is not being received by the terminal 2 belonging to the driver may not only mean that the terminal 2B does not belong to the driver 3A as confirmed by the link process, but also that the link between the terminals 2A, 2B and the driver 3A could not be established by the link process, or that, after the connection of HFP, an incoming call has arrived before performing the link process, or the like. That is, the last two conditions may be summarized as a determination as to which terminal 2 belongs to the driver 3A has not yet been determined.

Accordingly, in S8, the in-vehicle apparatus 1 outputs a ringtone, and displays the reception of a call. In this case, the display of the reception of a call means that the call receiving state is displayed on the screen as a message or the like, without displaying the caller information, such as a caller's name/number or the like. In other words, when the terminal 2, which is receiving the incoming call, has not been linked/associated with the driver 3A, the in-vehicle apparatus 1 displays a message that an in-coming call is being received to a terminal 2 without displaying the caller information. Therefore the driver 31 and the other occupants in the compartment 30 are prevented from knowing who is calling, thereby protecting the privacy of the occupant receiving the calling.

When an incoming call is received, the in-vehicle apparatus 1 and the terminal 2, which is receiving the incoming call, may output a ringtone, or, in the case of the portable terminal 2, may vibrate. The occupant receiving the incoming call may answer the incoming call by using the in-vehicle apparatus 1, especially, if the incoming call is to the terminal 2A, which belongs to the driver 3A. On the other hand, the occupant may pick up the incoming call by using the terminal 2, especially if the incoming call is to the terminal 2B, which belongs to the passenger 3B.

Accordingly, the in-vehicle apparatus 1, in S9, determines whether the terminal 2 is used to pick up the incoming call. If the incoming call is not picked up by the terminal 2 (S9:NO), such that the in-vehicle apparatus 1 has picked up the incoming call (i.e., an operation for starting the HFP call has been performed on the apparatus 1), the in-vehicle apparatus 1, in S10, determines that the terminal 2 receiving the incoming call belongs to the driver 3A, and links the terminal 2 with the driver 3A. The in-vehicle apparatus then proceeds to S5 to enable an HFP call.

On the other hand, when the incoming call is picked up by the terminal 2 (S9:YES), the in-vehicle apparatus 1, in S11, determines whether the occupant is speaking into the terminal 2. After picking up the incoming call via the terminal 2, the occupant, who received the call, may or may not perform an HFP call. Therefore, when the voice of the occupant is inputted to or directed towards a microphone of the terminal 2 (S11:YES), the in-vehicle apparatus 1 determines that the occupant does not intend to perform an HFP call. Therefore, in S12 the in-vehicle apparatus 1 performs a voice transfer to have the terminal 2 control the call to allow a private call. In other words, the in-vehicle apparatus 1 gives up control of a voice input/output, thereby not using the microphone 19 and the speaker 21 in the compartment 30 of the vehicle, leaving the call to the terminal 2's disposal.

If the occupant is not speaking into the terminal (S11:NO), the in-vehicle apparatus 1 finishes the process without performing a voice transfer, that is, without transferring call control from the in-vehicle apparatus 1 to the terminal 2.

In summary, the in-vehicle apparatus 1 links the terminal 2 with the driver 3A, and performs a hands-free call when the terminal 2 that belongs to the driver 3A is used for a call. On the other hand, when the terminal 2 that belongs to the passenger 3B is used for the call or when the terminal 2 that is used for the call is not identified to belong to the driver 3A, the in-vehicle apparatus 1 performs a control that does not allow a hands-free call so that the contents of the call are not heard by the other occupants in the compartment 30.

According to the in-vehicle apparatus 1 of the present embodiment, the following advantageous effects are achieved.

When a hands-free call function is used to place a call, the in-vehicle apparatus 1 determines whether the driver 3A is placing a call based on the speech direction, and identifies the terminal 2 based on whether the spoken name/number of the callee is found in the telephone book data. For example, when the passenger 3B possesses a terminal 2 and the driver 3A does not possess a terminal 2, the contents of a call to such terminal 2 may be disclosed by performing the HFP call after the establishment of an HFP connection without regard to the intention of the passenger 3B even when the terminal 2 belongs to the passenger 3B.

When the in-vehicle apparatus 1 has identified that the speaker is the driver 3A and the terminal 2 belongs to the driver 3A, the in-vehicle apparatus 1 links the terminal 2 with the driver 3A. The in-vehicle apparatus 1 then performs a hands-free call when the terminal linked with the driver 3A receives a call, and the in-vehicle apparatus 1 performs a private call when, for example, the terminal 2B, which is not linked with the driver 3A, receives a call, so that the contents of the call will not be disclosed to the driver 3A or to other occupants in the vehicle.

In such manner, the safety during the travel of the vehicle is improved by performing a hands-free call when the terminal 2 belonging to the driver 3A receives a call. In other words, an occasion for performing a hands-free call is appropriately determined, or whether a terminal 2 belongs to the driver 3A or not is appropriately determined. Further, an intention of the other occupant, i.e., a passenger 3B who is the owner of the terminal 2B, needing privacy for the contents of a call to the terminal 213, is appropriately accommodated.

Further, when the callee information extracted from the voice command is registered in the telephone book data, the speaker (i.e., a speaking person in the vehicle) is considered to know that the callee information is stored in the telephone book data, that is, the speaker is the owner of the terminal 2. Therefore, based on the identification of the terminal 2 according to the callee information extracted from the spoken voice, the owner of the terminal 2 is securely identified. Thus, whether a terminal 2 brought into the vehicle belongs to a driver 3A or to a passenger 3B is securely determined. That is, the terminal 2 which should be used for a hands-free call is securely identified.

In such case, the in-vehicle apparatus 1 determines whether to perform a hands-free call based on the identification of the speech direction and the identification of the terminal 2. That is, in the course of determining whether to perform a hands-free call, the in-vehicle apparatus 1 requires no user feedback, i.e., no operation by the driver 3A nor the passenger 3B, for distinguishing and determining whether the terminal 2 brought into the vehicle belongs to the driver 3A or the passenger 3B. As a result, the convenience of the user is improved.

The in-vehicle apparatus 1 is capable of establishing a short range wireless connection by Bluetooth connection, and automatically establishes an HFP connection to the terminal 2. When the HFP connection is established wirelessly, the HFP connection may be established against an intention of the passenger 3B, or may be established when the passenger 3B is not aware of the establishment of such connection. However, even when the HFP connection has been established in such manner, a call received by the terminal 2B that is not linked with the driver 3A will not be treated as a hands-free call, thereby enabling/providing a proper privacy protection for the contents of such call for the owner of the terminal 2B, that is, for the passenger 3B.

The in-vehicle apparatus 1 displays only a call reception message on the display unit 13 without displaying the caller information when a terminal 2 that has not been linked with the driver 3A, or that does not belong to the driver 3A receives a call. Therefore, a call to the terminal 2 that does not belong to the driver 3A will not lead to the display of the caller information, thereby protecting privacy regarding who is calling to a call receiver in the vehicle. That is, the caller will not be revealed to the driver 3A or other occupants in the vehicle. Thus, when the passenger 3B thinks that he/she does not want to disclose to the driver 3A who the caller is, such intention of the passenger 3B is appropriately accommodated.

The in-vehicle apparatus 1 is configured to be connectable to multiple terminals 2 through HFP connection. Therefore, the telephone book data of each of the multiple terminals 2 is stored by the in-vehicle apparatus 1 when the multiple terminals 2 are brought into the vehicle.

Even in such case, each of the multiple terminals 2 is identified by the telephone book data, and the driver 3A is identified by the speech direction, thereby enabling the identification of which one of the multiple terminals 2 belongs to the driver 3A. Therefore, whether or not to perform a hands-free call is appropriately determined without having any operation input from the driver 3A or the passenger 3B even when multiple terminals 2 are brought into the compartment 30.

Based on the present disclosure, the terminal identification unit 18 performs a voice recognition process for the voice input from the microphone 19 of the voice input unit 14. In particular, the terminal identification unit 18 extracts callee information regarding a callee of the hands-free call, and identifies, as the terminal 2 to be used for the hands-free call, the terminal 2 having the telephone book that has the callee information registered therein.

When a hands-free call is performed, the caller usually places a call to a callee that is registered in the telephone book data. In other words, when the callee information is registered in the telephone book data, the speaker who has voiced the callee information should understand that the callee information exists (i.e., is stored) in the telephone book data. By identifying the portable communication terminal based on the callee information, the owner of the terminal is securely identified. Therefore, the distinction regarding the owner of the two or more terminals that are brought into the vehicle is clarified, and the terminal to be used for a hands-free call is identified.

The communication unit 11 may establish the connection to the portable communication terminal 2 by a short range wireless communication method. When using the short range wireless communication method, the connection to the terminal 2 may be established without regard to, or against the intention of the owner of the terminal. Even in such case, the terminal 2 not linked with the driver will not be used for the hands-free call. Therefore, the content of the call is kept private, and the privacy of the caller/callee is protected.

The in-vehicle apparatus 1 (i.e., the hands-free device) is connectable to multiple portable communication terminals 2. The memory unit stores the telephone book data of each of the portable communication terminals 2. The terminal identification unit 18 identifies, as the terminal 2 used for the hands-free call, the terminal 2 having the telephone book that has the callee information registered therein from among the multiple terminals 2.

When a call is being received by the terminal 2 linked to the driver, the caller information is displayed on the display unit 13. Otherwise, the caller information is not displayed. In such manner, when the terminal 2 not belonging to the driver, or the terminal 2 that has not yet been identified to be belonging to the driver is receiving a call, the caller information will not be displayed. Therefore, the caller's privacy is protected from the driver and/or other occupants in the vehicle.

Other Embodiments

Although the present disclosure has been fully described in connection with the preferred embodiment thereof with reference to the accompanying drawings, it is to be noted that various changes and modifications will become apparent to those skilled in the art.

In the above embodiment, the two terminals 2A, 2B are connected to the in-vehicle apparatus 1. However, even when only one terminal 2 is in the compartment 30 of the vehicle, or even when three or more terminals 2 are in the compartment 30, the same advantageous effects are achieved. In such case, the only one terminal 2 in the compartment 30 is securely identified to be belonging to the driver 3A by the identification process of the terminal 2. That is, in other words, that the driver 3A is not using the other occupant's terminal 2 is securely proved.

In the above embodiment, the voice recognition function is started by (i.e., an input of a hands-free call start operation is performed as) an operation of the touch switch or the like. However, the voice recognition may be performed all the time, for readily starting a hands-free call by using a voice command. In other words, the hands-free call start operation may not necessarily be limited to the one exemplified in the above embodiment.

Though the in-vehicle apparatus 1 is described as an independent device in the above embodiment, the apparatus 1 may be implemented as a vehicle navigation apparatus or an audio/visual apparatus, in which a part of the functions and/or components are shared with the in-vehicle apparatus 1.

Though, in the above embodiment, the in-vehicle apparatus 1 is configured to display a reception of a call in S8 of the HFP call start process in FIG. 3, the identification information (i.e., a telephone number and/or a name) of the terminal 2 may be displayed in such step.

More practically, for example, when the terminal 2B of the passenger 3B receives a call, the passenger 3B may not notice the call if the terminal 2B is put in a bag or the like. In such case, the driver 3A may inadvertently pick up the call in step S9. Therefore, by including the telephone number and/or the name in the displayed reception message, the in-coming call is recognized as a call to the terminal 2B belonging to the passenger 3B, thereby preventing the driver 3A to pick up such call. In such case, the display of only the telephone number and/or the name of the terminal 2B will not lead to the disclosure of who the caller is, thereby appropriately protecting the privacy.

Though, in the above embodiment, the HFP call start process in S7 of FIG. 3 determines whether the terminal 2 receiving the incoming call is not the terminal 2 belonging to the driver 3A is described as including a condition that which one of the terminals 2 belongs to the driver 3A, such step S7 may also include a determination of a condition that the terminal 2B is confirmed to be belonging to the passenger 3B. In other words, when the speech direction is the passenger 32 seat side (i.e., a pattern B of FIG. 2) and the spoken caller information is included in the terminal 2B, the terminal 2B may be linked with the passenger 3B based on the speech direction and the telephone book data, and the terminal 2B may be confirmed as a terminal 2 that is not belonging to the driver 3A.

In the above embodiment, though the terminal 2 used for a hands-free call is identified based on the spoken voice and the telephone book data in steps S21, S22 of the link process in FIG. 4, a terminal 2 to be used for a hands-free call may be identified in a different manner. That is, for example, by confirming a call condition with each of the multiple terminals 2 regarding a hands-free call and by identifying a terminal 2 that is in a calling condition, a terminal to be used for a hands-free call may be identified.

Such changes and modifications are to be understood as being within the scope of the present disclosure as defined by the appended claims.

What is claimed is:

1. A hands-free device disposed in a vehicle for performing a hands-free call for a portable communication terminal, the portable communication terminal including a telephone book data stored therein, the hands-free device comprising:
a communication unit being communicably coupled to the portable communication terminal and receiving the telephone book data from the portable communication terminal;
a memory unit storing the telephone book data received by the communication unit;
a voice output unit having a speaker for outputting a receiving voice of the hands-free call;
a voice input unit having at least two microphones for inputting a outgoing voice of the hands-free call;
an operation input unit receiving a hands-free call start operation;
a speech direction identification unit identifying a speech direction of the outgoing voice inputted by the voice input unit when the hands-free call start operation is received by the operation input unit;
a terminal identification unit identifying the portable communication terminal being used for the hands-free call when the hands-free call start operation is received by the operation input unit; and a control unit performing a link process linking the portable communication terminal identified by the terminal identification unit with a driver as a driver-linked terminal when the speech direction of the outgoing voice is identified as a driver side by the speech direction identification unit, wherein the control unit performs the hands-free call when a call being received is through the driver-linked terminal and does not perform the hands-free call when the call being received is not through the driver-linked terminal.

2. The hands-free device of claim 1, wherein
the terminal identification unit performs a voice recognition process of the voice from the voice input unit for extracting a caller information regarding a caller of the hands-free call and determining whether the caller information is included in the telephone book data, and the terminal identification unit identifies, as the portable communication terminal used for the hands-free call, the portable communication terminal having the telephone book that has the caller information registered therein.

3. The hands-free device of claim 1, wherein
the communication unit communicably couples to the portable communication terminal by a short range wireless communication method.

4. The hands-free device of claim 1, wherein
the communication unit communicably couples to a plurality of the portable communication terminals, the memory unit stores the telephone book data of each of the plurality of portable communication terminals, and the terminal identification unit identifies, as the portable communication terminal used for the hands-free call, the portable communication terminal having the telephone book that has the caller information registered therein from among the plurality of portable communication terminals.

5. The hands-free device of claim 1 further comprising:
a display unit displaying a caller information of the call being received, wherein the display unit displays the caller information when the call being received is from the driver-linked terminal, and does not display the caller information when the call being received is not from the driver-linked terminal.

* * * * *